United States Patent
Modrzejewski et al.

(10) Patent No.: US 10,619,717 B2
(45) Date of Patent: Apr. 14, 2020

(54) COMPOSITE REINFORCED RING GEAR

(71) Applicant: Bell Helicopter Textron Inc., Fort Worth, TX (US)

(72) Inventors: Brian Stanley Modrzejewski, Keller, TX (US); Siddhesh Pradeep Raje, Fort Worth, TX (US); Gilberto Morales, Arlington, TX (US); Kenneth Myron Jackson, Euless, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 204 days.

(21) Appl. No.: 15/676,146

(22) Filed: Aug. 14, 2017

(65) Prior Publication Data

US 2019/0048983 A1 Feb. 14, 2019

(51) Int. Cl.
| | |
|---|---|
| *F16H 55/06* | (2006.01) |
| *F16H 1/28* | (2006.01) |
| *B64C 27/12* | (2006.01) |
| *F16H 57/03* | (2012.01) |
| *F16H 57/032* | (2012.01) |
| *F16H 57/02* | (2012.01) |
| *F16H 1/36* | (2006.01) |

(52) U.S. Cl.
CPC .......... *F16H 55/06* (2013.01); *B64C 27/12* (2013.01); *F16H 1/28* (2013.01); *F16H 57/03* (2013.01); *F16H 57/032* (2013.01); *F16H 1/36* (2013.01); *F16H 2057/02043* (2013.01)

(58) Field of Classification Search
None
See application file for complete search history.

(56) References Cited

U.S. PATENT DOCUMENTS

| | | | | |
|---|---|---|---|---|
| 1,492,145 | A | * | 4/1924 | Talley ............... F16H 55/06 74/445 |
| 3,200,665 | A | * | 8/1965 | Wells ............... F16H 55/06 74/446 |
| 3,541,875 | A | * | 11/1970 | Demorest ......... F16H 57/041 74/468 |
| 3,730,009 | A | * | 5/1973 | Mead ................ F16H 55/06 474/161 |
| 8,863,924 | B2 | | 10/2014 | Ehinger et al. |
| 9,290,266 | B2 | | 3/2016 | Robertson et al. |
| 2002/0112555 | A1 | * | 8/2002 | Chikaraishi ........ B62D 5/0409 74/388 PS |
| 2007/0089555 | A1 | * | 4/2007 | Tomoda ............. B29C 45/16 74/443 |
| 2010/0322812 | A1 | * | 12/2010 | Geiman ............. B21K 1/30 419/6 |
| 2016/0076629 | A1 | | 3/2016 | Modrzejewski |
| 2016/0363206 | A1 | * | 12/2016 | Modrzejewski ........ B64C 27/12 |
| 2018/0320772 | A1 | * | 11/2018 | Anand ............... F16H 55/02 |

* cited by examiner

*Primary Examiner* — William Kelleher
*Assistant Examiner* — Gregory T Prather
(74) *Attorney, Agent, or Firm* — Winstead PC

(57) ABSTRACT

A hybrid composite reinforced ring gear minimizing radial deformation during high RPM conditions includes a composite backing secured to a metal rim. In use, at operating temperature the composite backing contracts while the metal rim expands thus creating a compressive stress on the metal rim and significantly reduces radial deformation due to centrifugal forces as compared to an all steel ring gear.

2 Claims, 3 Drawing Sheets

COMPOSITE REINFORCED RING GEAR

STATEMENT REGARDING FEDERALLY SPONSORED RESEARCH OR DEVELOPMENT

This invention was made with government support under contract number W911W6-14-2-0004 awarded by the U.S. Army Aviation Applied Technology Directorate (AATD) Program. The government has certain rights in the invention.

BACKGROUND

This section provides background information to facilitate a better understanding of the various aspects of the disclosure. It should be understood that the statements in this section of this document are to be read in this light, and not as admissions of prior art.

Generally a ring gear is a ring-shaped cylindrical disk with teeth cut into the periphery or interior face of the rim. Typically a ring gear is manufactured of steel or a steel alloy for the strength properties and mostly used in transmissions for automotive or aircraft applications. The teeth of the ring gear are driven by a smaller pinion gear or planetary gear. A common function of the ring gear is to transfer torque from the pinion to a flywheel of an internal combustion engine.

In use, ring gears are often low rotation or even stationary. In high rotation applications, e.g. 5,000 to 10,000 revolutions per minute (RPM), centrifugal force is significant and causes high stress on the teeth which can result in deformation and/or breakage of the teeth. In order to combat the high stress levels created by centrifugal forces, additional stiffness is required. Increasing the amount of steel material is a way to increase the stiffness of steel. Increasing the steel content adds mass which, in turn, increases the centrifugal forces created by the spinning ring gear and counteracts the additional stiffness gained. Additional mass is especially undesirable in aircraft applications where weight negatively affects aircraft performance.

SUMMARY

An example of a composite reinforced ring gear includes a metal rim having a rim inner circumference and a rim outer circumference, a set of engagement features formed on the rim inner circumference, and a composite backing positioned circumferentially about the rim outer circumference.

An example of a power train system of a rotorcraft includes an engine and a rotor mast operatively connected to a gearbox, where the gearbox has a composite reinforced ring gear including a metal rim affixed to a composite backing and a set of teeth extending inward from the metal rim.

An example of a method includes operating a rotorcraft having a composite reinforced ring gear, wherein the operating includes rotating the composite ring gear at a speed and the composite reinforced ring gear includes a metal rim having a thickness between an outer circumference and an inner circumference, teeth formed on the inner circumference of the metal rim, and a composite backing having an interference fit around the outer circumference of the metal rim, wherein a lower coefficient of thermal expansion (CTE) of the composite backing is less than the CTE of the metal rim.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
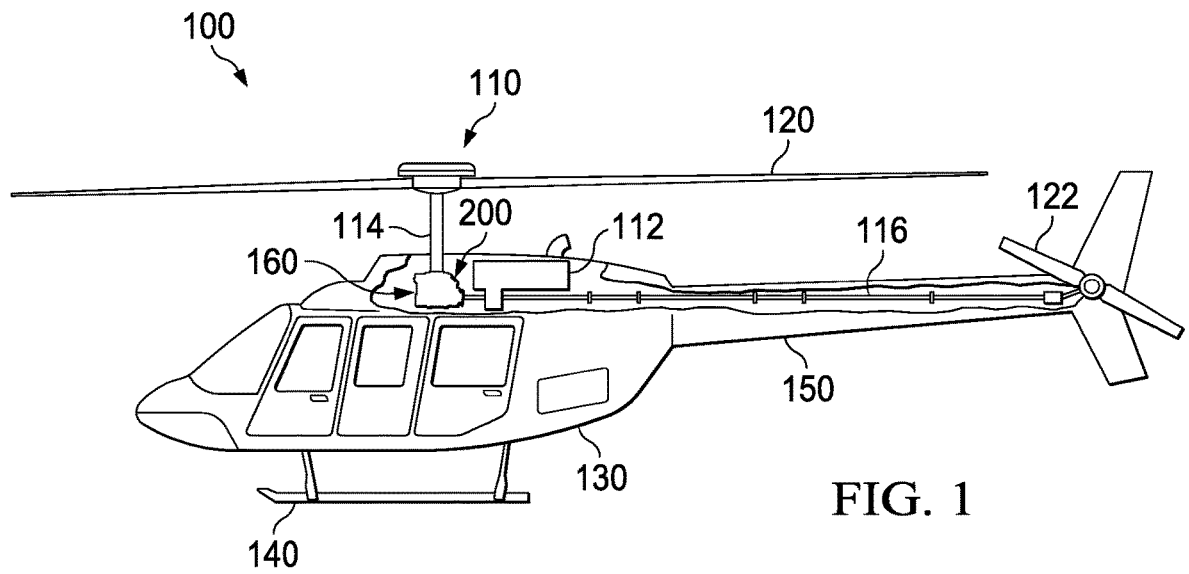
FIG. 1 is a perspective view of a rotorcraft implementing a composite reinforced ring gear according to aspects of the disclosure.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

FIG. 1 illustrates an example of a rotorcraft 100 incorporating a composite reinforced ring gear 200. Rotorcraft 100 includes power train system 110, main rotor blades 120, tail rotor blades 122, fuselage 130, landing gear 140, and empennage 150. Power train system 110 may rotate blades 120 and blades 122. Power train system 110 includes engine 112, gearbox 160, rotor mast 114, and tail rotor drive shaft 116. Engine 112 supplies torque to tail rotor drive shaft 116 for rotating blades 122. Gearbox 160 may be a rotor transmission system. Power train system 110 may include more or different gearboxes 160. Composite reinforced ring gear 200 is located for example in gearbox 160. The rotorcraft is illustrated in FIG. 1 as a helicopter as an example of a rotorcraft. The composite reinforced ring gear 200 may be implemented in other powered lift rotorcrafts such as tiltrotors.

Fuselage 130 represents the body of rotorcraft 100 and may be coupled to power train system 110 such that power train system 110 and blades 120 may move fuselage 130 through the air. Landing gear 140 supports rotorcraft 100 when rotorcraft 100 is landing or when rotorcraft 100 is at rest on the ground. Empennage 150 represents the tail section of the aircraft and features blades 122. Power train system 110 and blades 122 may collectively provide thrust in the same direction as the rotation of blades 120 to counter the torque effect created by blades 120.

A gearbox 160 may include various gears. A gear is a rotating part having engagement features, such as teeth or notches that mesh with another part that also has engagement features, to transmit torque. Gears in a gearbox may be used to provide speed and torque conversions. There are different types of gears that may be used in a gearbox including but not limited to a spur gear, helical gear, bevel gear, or a ring gear.

Figure 2A:
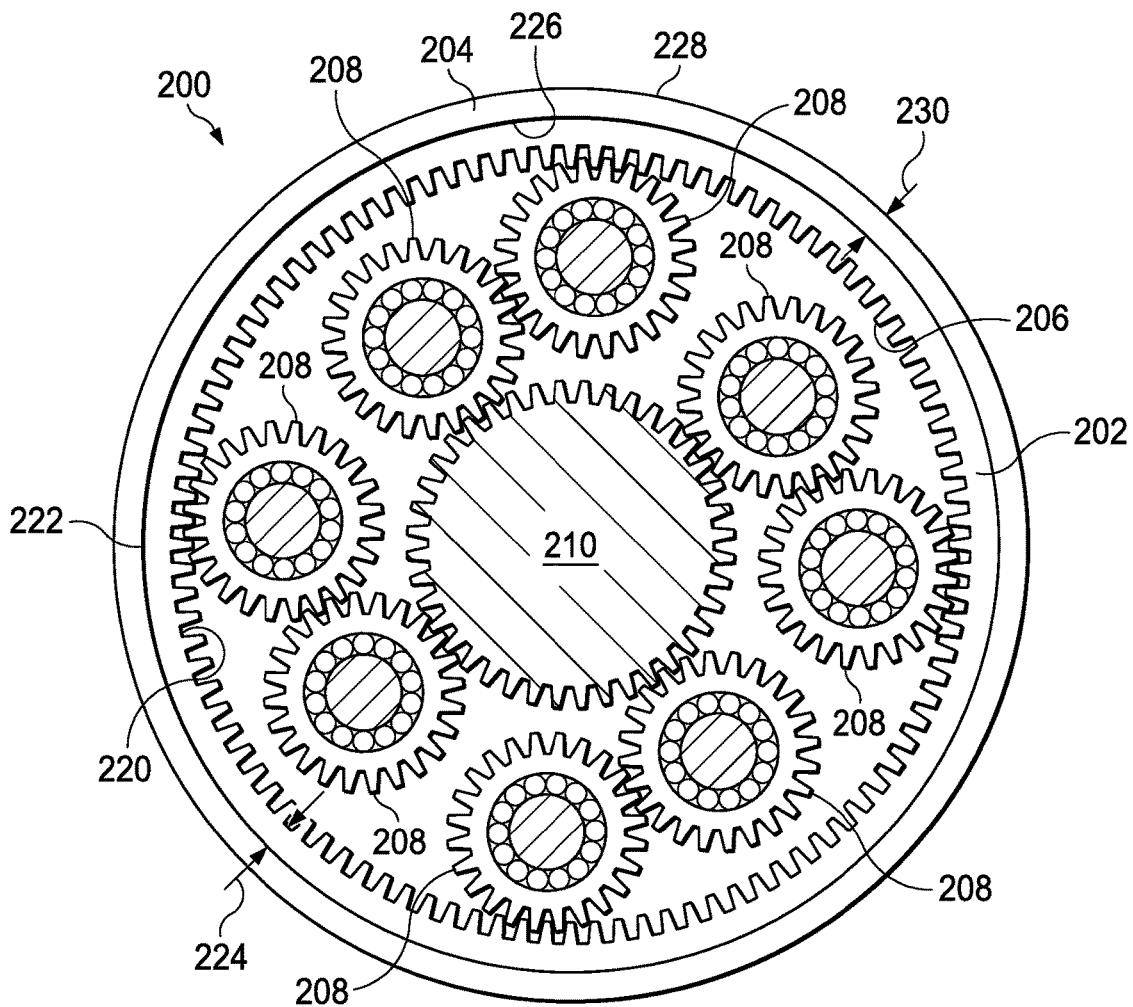
FIG. 2A is an elevation view of a composite reinforced ring gear according to one or more aspects of the disclosure.
Figure 2B:
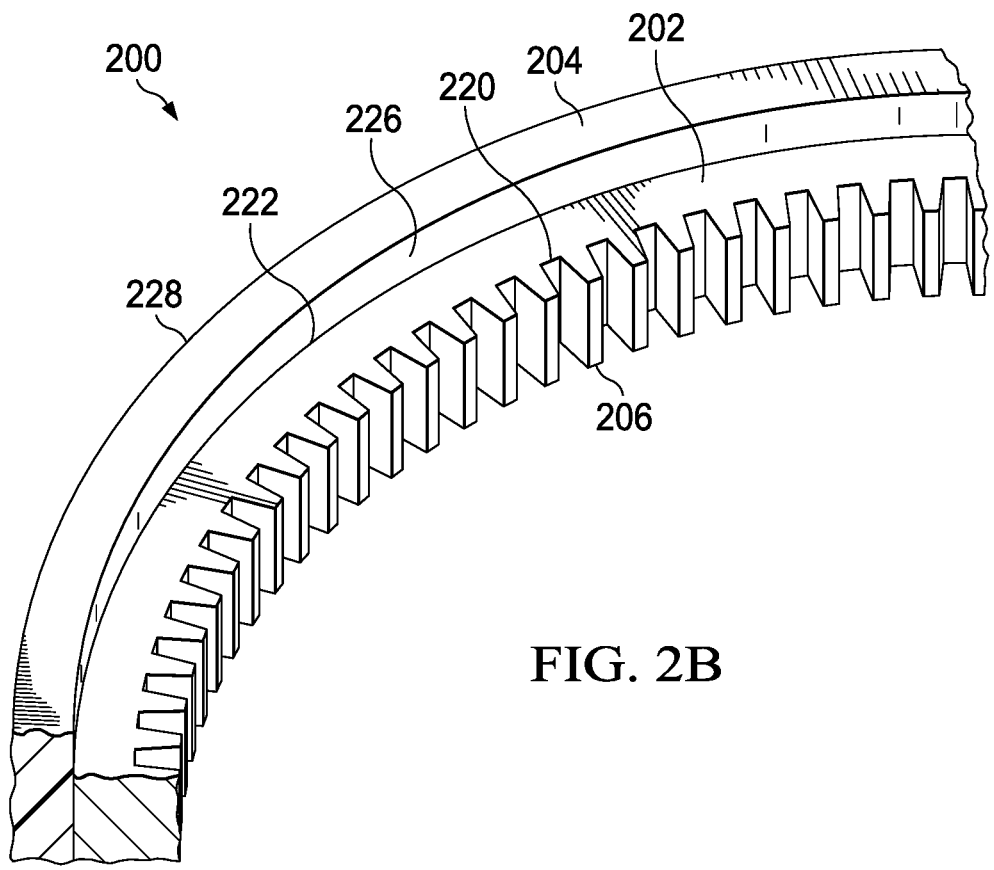
FIG. 2B is a partial perspective view of a composite reinforced ring gear.

With reference in particular to FIGS. 2A and 2B composite reinforced ring gear 200 is a hybrid composite and steel ring gear that has a reduced weight over an all steel ring gear while retaining the strength of the all steel ring gear. An outer member 204 made of composite material reinforces an inner metal member 202 and stiffens the composite reinforced ring gear. Composite reinforced ring gear 200 is a light weight ring gear, relative to an all steel ring gear, that has the stiffness needed to reduce load deflection and maintain the wear characteristics of the steel.

Ring gear 200 includes steel rim 202 surrounded by composite backing 204. Steel rim 202 may include engagement features, such as teeth 206 or notches, that can be configured to transmit torque to other components such as planetary pinions 208 and sun gear 210. Steel rim 202 has inner circumference 220 and outer circumference 222 defining thickness 224. Composite backing 204 has inner circumference 226 and outer circumference 228 defining thickness 230. Ring gear 200 is an internal ring gear as teeth 206 extend radially inward from inner circumference 220. Steel rim 202 may be manufactured for example of a metal or metal alloy such as steel or carbon steel having a density in the range of 0.18-0.40 lb/in³. Composite backing 204 may be manufactured for example of composite carbon material such as IM7 or IM10 carbon fiber having a density in the range of 0.06-0.08 lbs/in³. Composite backing 204 has a lower density than steel rim 202. According to one or more embodiments, the density of composite backing 204 is three to five times less than the density of steel rim 202.

Composite reinforced ring gear 200 utilizes a thermal expansion property difference between the carbon fiber material of composite backing 204 and the steel of steel rim 202 to create a mechanical interference or press fit between composite backing 204 and steel rim 202 to affix composite backing 204 to steel rim 202. The interference fit maintains a minimum interference fit at low (resting) temperature, e.g. in the range of −50 to 150 degrees Fahrenheit, so that at higher (operating) temperature, e.g. in the range of 250 to 300 degrees Fahrenheit, the composite material has a desired stress with the planetary gear loading.

The coefficient of thermal expansion (CTE) describes how the size of an object changes with a change in temperature. Specifically, it measures the fractional change in size per degree change in temperature at a constant pressure. Steel rim 202 has a positive CTE and expands as temperature rises. Composite backing 204 may have a low to negative thermal expansion property causing composite backing 204 to contract as it heats up. Composite backing 204 has a lower CTE than steel rim 202. Thus, at operating temperature, the interference fit between steel rim 202 and composite backing 204 increases as the steel of steel rim 202 expands while the composite material of composite backing 204 contracts. At operating temperature, the increased interference fit counteracts the stress due to tension from the centrifugal loading by creating a radial compressive stress on steel rim 202. The radial compressive stress created by composite backing 204 minimizes radial deformation of steel rim 202 typically caused by centrifugal forces.

A non-limiting example of the thermal fit calculations between steel rim 202 and composite backing 204 over a range of temperatures is shown in the tables below.

TABLE 1

Material Properties

| | Thickness (in.) at 70° F. | Modulus of Elasticity (psi) | CTE (ppm/° F.) |
|---|---|---|---|
| Steel Rim | 0.0625 | 30,000,000 | 5.18 |
| Composite Backing (tension) | 1.0 | 22,900,000 | −0.36 |
| Composite Backing (tension) | | 22,700,000 | |

TABLE 2

| Temperature (° F.) | Steel Rim Diameter at Outer Circumference 222 (in) | Composite Backing Diameter at Inner Circumference 226 (in) | Interference | Percent Strain Composite |
|---|---|---|---|---|
| 70 | 12 | 11.9991 | x < 0 | |
| 250 | 12.00111888 | 11.99903142 | 0.002087462 | 0.017% |
| −64 | 11.99916706 | 11.99916706 | 0 | 0.000% |
| 600 | 12.00329448 | 11.99888023 | 0.004414251 | 0.037% |

It should be appreciated that composite backing 204 may be formed from other composite materials capable of the desired strength properties while providing a compressive stress due to low or negative thermal expansion and a density less than steel rim 202.

Composite backing 204 provides weight reduction over ring gears comprised of all steel while maintaining the strength of an all steel ring gear. The weight reduction is not merely for the sake of weight reduction but also to reduce the centrifugal load. The weight reduction decreases the centrifugal loading on the ring gear when the ring gear rotates. Composite reinforced ring gear 200 meets a stiffness requirement dictated by the application of ring gear 200 which depends on loads and geometry. The thickness, and thus the weight, of steel rim 202 is determined, in-part, by the required stiffness. Ring gear 200 reduces the centrifugal load by reducing the thickness of steel rim 202 and adding composite backing 204. Composite backing 204 achieves the required stiffness by applying compressive stress to steel rim 202. The decreased centrifugal loading lessens stress at the root of teeth 206.

The reduction in centrifugal loading and radial compression of composite backing 204 is advantageous at high rotational speeds, e.g. in the range of 5,000 to 15,000 RPM. A non-limiting example of composite reinforced ring gear 200 having steel rim 202 formed of C64 steel and composite backing 204 formed of IM7 carbon fiber is subjected to a centrifugal velocity of 1,000 radians per second and warmed from a resting temperature of 72° to an operating temperature of 280° F. With the stated properties in the example the composite reinforced ring gear 200 may reduce the stress on the root of teeth 106 in the range of 65 to 75% less than the stress on the teeth of a same sized all steel ring gear subjected to the same centrifugal velocity and temperature. Additionally, the composite reinforced ring gear 200 may radially deform the teeth of steel rim 202 about 35 to 45% less than the teeth of a same sized all steel ring gear.

Stationary or low rotational speed applications of composite reinforced ring gear 200 also benefit from the weight reduction and compressive stress provided by composite backing 204. However, since the difference in CTE between the metal rim and the composite backing is less beneficial when stationary, the interference fit should be adjusted to accommodate the lower, at rest temperature. Other means of bonding the composite layer to the metal rim may include an adhesive layer or mating geometric shapes as will be discussed in further detail below.

Figure 3:
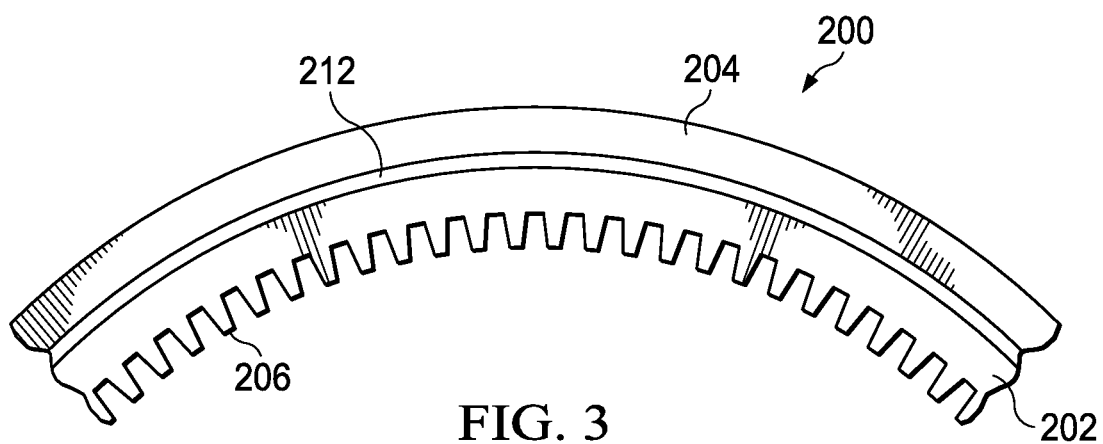
FIG. 3 is a partial top view of a composite reinforced ring gear according to an embodiment.

FIG. 3 illustrates a composite reinforced ring gear 200 including a layer 212 between steel rim 202 and composite backing 204. Layer 212 may be a sacrificial composite bonding layer comprised of glass or epoxy that can be machined to tolerance. Layer 212 may be formed from other machinable composite materials capable of providing the desired strength properties of composite backing 204 while having a density less than steel rim 202. Layer 212 may be machined to adjust the interference fit between steel rim 202 and composite backing 204. Layer 212 can serve as a protective layer to reduce impacts of corrosive issues in the steel to carbon interface of steel rim 202 and composite backing 204.

Figure 4:
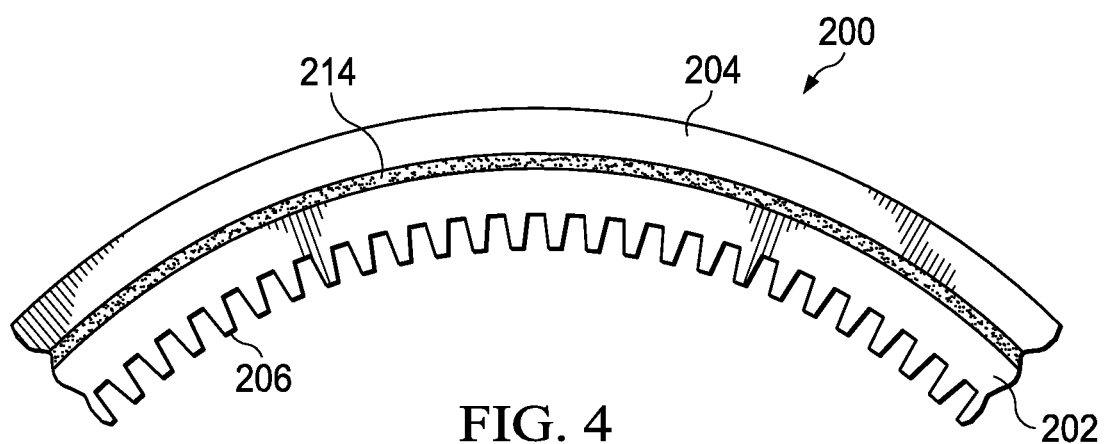
FIG. 4 is a partial top view of a composite reinforced ring gear according to an embodiment.

FIG. 4 illustrates a composite reinforced ring gear 200 having an adhesive layer 214 bonding steel rim 202 and composite backing 204 together. Adhesive layer 214 may be for example an epoxy or polyurethane adhesive to bond steel rim 202 to composite backing 204.

Figure 5:
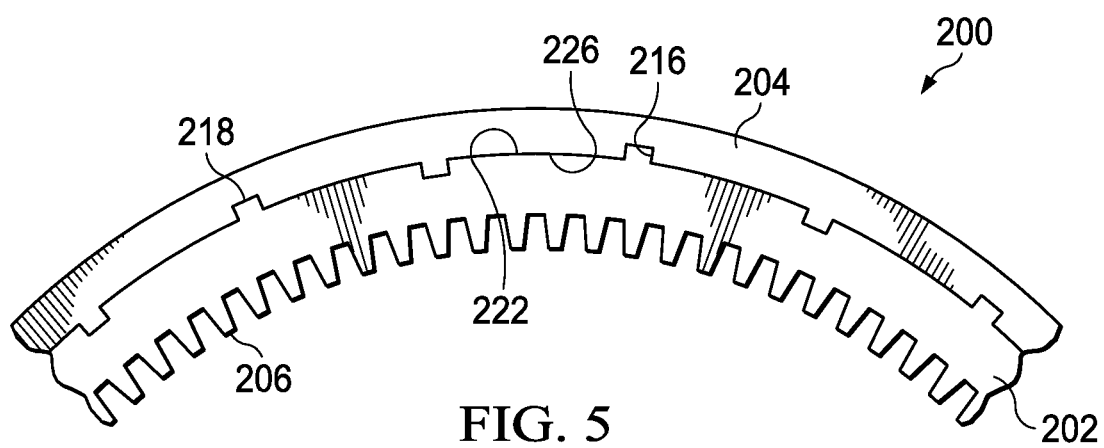
FIG. 5 is a partial top view of a composite reinforced ring gear according to an embodiment.

FIG. 5 illustrates a composite reinforced ring gear 200 utilizing mating geometric elements 216, 218 located respectively on outer circumference 222 of steel rim 202 and inner circumference 226 of composite backing 204. Geometric elements 216, 218 provide a bonding surface between the steel rim 202 and composite backing 204 that prevents rotation of steel rim 202 with respect to composite backing 204. Geometric elements 216, 218 may be any shape that when engaged prevents rotational movement of steel rim 202 with respect to composite backing 204.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A composite reinforced ring gear, comprising:
   a metal rim having a rim inner circumference and a rim outer circumference;
   a set of engagement features formed on the rim inner circumference;
   a composite backing positioned circumferentially around the rim outer circumference; and
   a composite bonding layer disposed between the metal rim and the composite backing.

2. The composite reinforced ring gear of claim 1, wherein the composite bonding layer comprises at least one of glass and epoxy.

* * * * *